Dec. 18, 1951          C. B. RICHEY          2,579,274
STABILIZER FOR TRACTOR MOUNTED IMPLEMENTS
Filed June 29, 1949
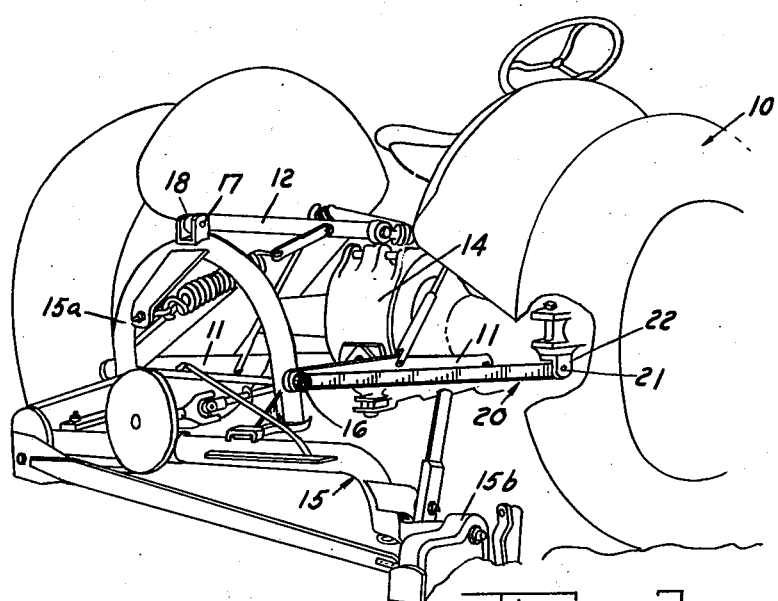
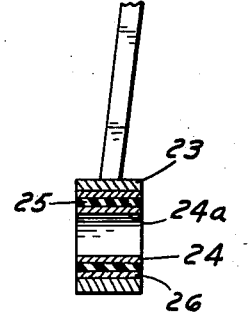
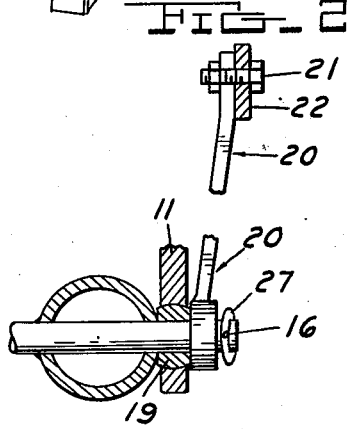
INVENTOR.
CLARENCE B. RICHEY
BY
*W. C. Schaich*
ATTORNEY

Patented Dec. 18, 1951

2,579,274

UNITED STATES PATENT OFFICE 2,579,274

STABILIZER FOR TRACTOR MOUNTED IMPLEMENTS

Clarence B. Richey, Royal Oak, Mich., assignor to Dearborn Motors Corporation, Highland Park, Mich., a corporation of Delaware Application June 29, 1949, Serial No. 102,076

3 Claims. (Cl. 280—33.44)

This invention relates to an improved stabilizer arrangement for tractor mounted implements which are subjected to lateral vibrations.

It has become the common practice to mount various types of farm implements directly upon a tractor and the most common form of such mounting arrangements is the so-called three-point suspension system which has been incorporated in the well-known Ford tractor. When the implement thus mounted to the tractor is of the type that is subjected to lateral vibration, such as, for example, a mower having a reciprocating cutter bar, it necessarily follows that such lateral vibrations are transmitted to a large extent to the tractor, producing not only discomfort for the operator, but, in addition, subjecting the moving components of the tractor to increased wear and fatigue strains.

In my copending application, Serial No. 85,214, filed April 2, 1949, I have disclosed an improved tractor carried mower construction which substantially eliminates the transmitting of lateral vibrations from the mower to the tractor by virtue of permitting the entire mower unit to vibrate laterally, substantially independently of the tractor.

In such mower construction, it is necessary, however, to employ some means for limiting the lateral displacement of the mower unit relative to the tractor without interfering with the freedom of the lateral vibration of the mower unit relative to the tractor. In accordance with this invention, a novel form of stabilizing link is employed as an additional connection between the mower unit and the tractor. The joint between the stabilizer link and the mower unit incorporates a resilient or yieldable connection which will permit a limited amount of lateral vibration in the mower unit but yet will definitely limit any excessive lateral displacement of the mower unit with respect to the tractor.

Accordingly, it is an object of this invention to provide an improved stabilizing arrangement for tractor mounted implements, and particularly for implements such as mowers which are subjected to lateral vibrations.

A particular object of this invention is to provide an improved stabilizing link for connection between a tractor and a tractor mounted implement which will positively limit any excessive lateral displacement of the implement relative to the tractor, but which will permit substantially unimpeded lateral vibration of the implement relative to the tractor and thereby reduce the transmitting of such vibrations to the tractor.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a perspective view of a tractor and a tractor mounted implement, such mounting including a stabilizing bar constructed in accordance with this invention.

Figure 2 is an enlarged scale fragmentary sectional view taken on a plane passing through the axis of connection of the stabilizing bar to the tractor mounted implement.

Figure 3 is an elevational view showing a stabilizing bar embodying this invention with the bushing portion thereof shown in section.

As shown on the drawings:

In Figure 1, the rear end portion of a well-known type of tractor is represented by the numeral 10. Such tractor is provided with the equally well-known three-point implement mounting arrangement comprising hydraulically liftable, transversely spaced, lower links 11 and a centrally mounted positioning or top link 12. The links 11 and 12 are all pivotally connected in trailing relationship to the rear axle housing 14 of the tractor and such pivotal connections include the customary spherical type bearings (not shown) which permit lateral as well as vertical swingable movements of the links 11 and 12 with respect to the tractor.

An implement 15, here shown as a rear mounted mower, is pivotally connected to the trailing ends of links 11 and 12. The implement 15 includes a rigid U-shaped frame 15a and a cutter bar portion 15b. Frame 15 has a pair of laterally spaced and projecting mounting pins 16 respectively engaged by the lower links 11, and a top link mounting pin 17, supported in upstanding ears 18 and engageable with the rear end of top link 12. The remaining mechanism of the mower unit 15 is suitably connected to the bottom ends of the U-shaped frame 15a in the manner that is more fully described in my above referred to copending application and the copending application of Vernon O. Hauswirth, Serial No. 102,058, filed June 29, 1949, and assigned to the assignee of this application.

The links 11 and 12 include spherical bearing members 19 in their trailing ends to receive the mounting pins provided on the implement 15 so that when the implement 15 is completely assembled to the links 11 and 12, the entire implement may be freely laterally moved relative to the tractor over a substantial range of movement. By virtue of such lateral freedom, the entire implement 15 may vibrate laterally with respect to the tractor and, as will be recognized by those skilled in the art, a substantial degree of vibration is inherently involved in a mower unit employing a reciprocating cutter bar.

It is, however, very necessary that the lateral displacement of the mower 15 in the direction away from its cutter bar portion 15b be positively restricted inasmuch as the vegetation being cut by the cutter bar inherently attempts to swing the entire mower unit 15 toward the opposite side of the tractor, or the left side of the tractor as viewed in Figure 1.

In accordance with this invention, excessive lateral displacement of the mower unit 15 with respect to the tractor is positively limited by the provision of a stabilizing link 20. Such link is pivotally mounted to the tractor by a pin 21 which is supported by a bracket 22 mounted in depending relationship to the tractor axle housing 14. The pivotal axis of the pin 21 is in alignment with the pivotal axis of the pivotal connections of the lower links 11 to the tractor 10, but the bracket 22 is laterally spaced with respect to the pivotal mounting of the right hand lower link 11 as shown in Figure 1.

The free end of stabilizing link 20 is pivotally connected to the same mounting pin 16 adjacent on the implement 15 as the adjacent lower link 11 is connected. However, the mounting of stabilizing link 20 to the implement 15 is accomplished by a special bushing portion 23 formed on the end of stabilizer link 20 and best shown in Figure 3. Such bushing portion includes an inner cylindrical rigid sleeve 24 and an intermediate sleeve 25 of rubber or rubber-like resilient material, and an outer bonding sleeve 26 which is rigidly mounted in the bushing portion 23 of the stabilizer link 20. The resilient sleeve 25 is suitably bonded or compressed between the inner and outer rigid sleeves 26 so as to permit a limited degree of radial movement of the inner sleeve 24 with respect to the outer mounting sleeve 26, and hence with respect to the bushing portion 23 of the stabilizer link 20. The bore portion 24a of the inner sleeve 24 is snugly mountable on the end of the mounting pin 16 of the implement 15 and is retained in assembly thereon by the customary link pin 27.

With the described arrangement of the stabilizer link 20, it is apparent that the stabilizer link 20 is disposed in generally triangularly spaced relationship with respect to the adjacent lower link 11 and hence, in the absence of a resilient connection between the stabilizer link 20 and the implement 15, the implement would be substantially rigidly secured to the tractor 10 as far as the lateral movements are concerned. However, by virtue of the provision of the resilient sleeve 25 in the implement mounting portion of the stabilizing link 20, the effective length of stabilizing link 20 can vary slightly by radial compression of resilient sleeve 25 and the implement 15 may vibrate laterally to a limited degree, and particularly, in sufficient degree so as to be free to respond to the lateral vibrations normally produced in the implement 15 by the operation of the transversely reciprocating cutter bar. Hence, the transmission of such lateral vibrations to the tractor is substantially eliminated. At the same time, any excessive lateral displacement of the implement 15 relative to the tractor is positively prevented by virtue of the triangular relationship of the stabilizer link 20 with respect to the adjacent lower hitch link 11.

I claim:

1. In combination with a hitch for use with a tractor and an implement requiring a substantially rigid lateral tractor-implement connection but subject to transverse vibration, said hitch including a pair of laterally spaced laterally swingable hitch links for pivoted connection to the tractor and the implement and a laterally rigid stabilizing link for connection to the tractor in spaced relation to one of said links and to the implement in juxtaposition to the same link to laterally brace the links against substantial lateral movement, deflectable resilient means interposed between said stabilizing link and its point of attachment to said implement for accommodating change in the effective length of said stabilizing link as said implement vibrates to accommodate corresponding slight lateral vibration in said stabilized linkage.

2. In combination with a hitch for use with a tractor and an implement requiring a substantially rigid lateral tractor-implement connection but subject to transverse vibration, said hitch including a pair of laterally spaced laterally swingable forwardly converging hitch links for pivoted connection to the tractor and the implement and a laterally rigid stabilizing link for connection to the tractor and to the implement in triangular relationship with one of said hitch links to laterally brace the links against substantial lateral movement, a cylindrical laterally deflectable resilient sleeve interposed between said stabilizing link and one of its points of attachment for accommodating slight lateral vibratory movement of the stabilized hitch linkage for accommodating corresponding change in the effective length of said stabilizing link.

3. In combination with a hitch for use with a tractor and an implement requiring a substantially rigid lateral tractor-implement connection but subject to transverse vibration, said hitch including a pair of laterally spaced hitch links pivotally connected to the tractor and to the implement for lateral swinging movement, and a laterally rigid stabilizing link for pivotal connection to the tractor in laterally spaced relation to one of said hitch links and to the implement in juxtaposition to the same link to laterally brace the links against substantial lateral movement, deflectable resilient means interposed between said stabilizing link and its point of attachment to said implement including a pair of concentric sleeve portions rigid with said stabilizing link and said implement respectively, and a resiliently deflectable sleeve interposed between said rigid sleeves for accommodating relative lateral movement of the sleeves, whereby change in the effective length of said stabilizing link is accommodated as said implement vibrates laterally to accommodate corresponding vibration in said linkage.

CLARENCE B. RICHEY.

REFERENCES CITED

The following references are of record in the file of this patent:

UNITED STATES PATENTS

| Number | Name | Date |
|---|---|---|
| 1,778,503 | Lord | Oct. 14, 1930 |
| 1,871,861 | Rossman | Aug. 16, 1932 |
| 1,913,513 | Rossman et al. | June 13, 1933 |
| 2,136,440 | Hueffered | Nov. 15, 1938 |
| 2,347,898 | Ferguson | May 2, 1944 |
| 2,398,365 | Ellis | Apr. 16, 1946 |